No. 654,919. Patented July 31, 1900.
C. G. & J. J. ROBERTON.
TIRE.
(Application filed Aug. 9, 1898.)

(No Model.) 2 Sheets—Sheet 1.

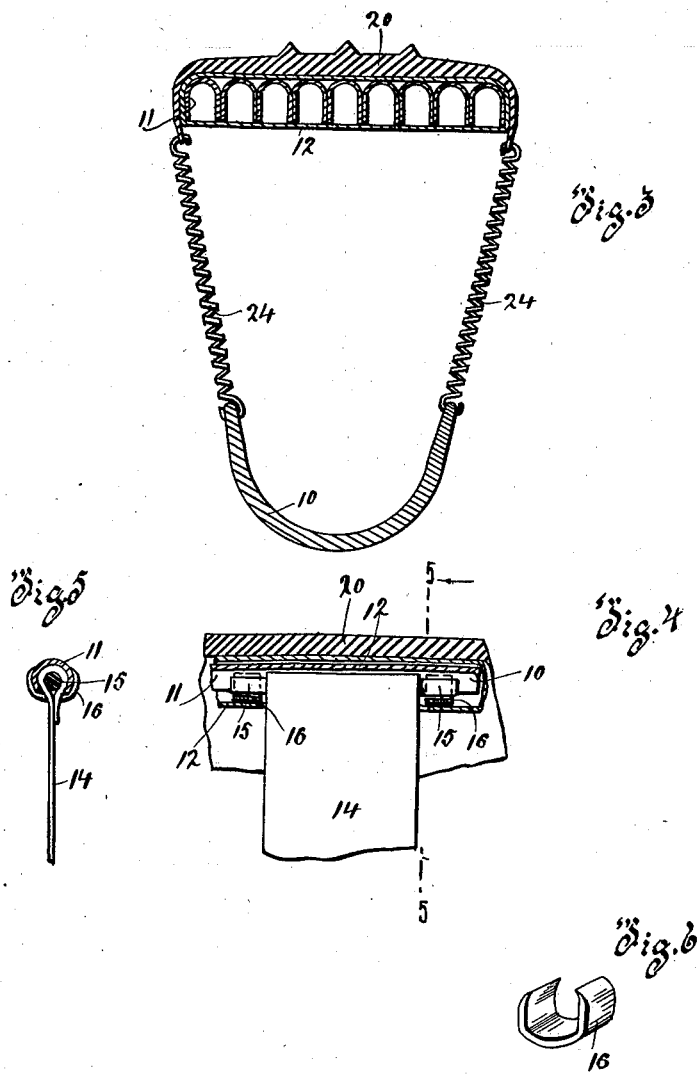

UNITED STATES PATENT OFFICE.

CHARLES GEORGE ROBERTON, OF GLASGOW, SCOTLAND, AND JAMES JACKSON ROBERTON, OF LEEDS, ENGLAND, ASSIGNORS OF ONE-THIRD TO GEORGE E. ROBERTON, OF MONTREAL, CANADA.

TIRE.

SPECIFICATION forming part of Letters Patent No. 654,919, dated July 31, 1900.

Application filed August 9, 1898. Serial No. 688,219. (No model.)

*To all whom it may concern:*

Be it known that we, CHARLES GEORGE ROBERTON, engineer, of Glasgow, in the county of Lanark, Scotland, and JAMES JACKSON ROBERTON, traveler, of Leeds, in the county of York, England, have invented certain new and useful Improvements in Tires; and we do hereby declare that the following is a full, clear, and exact description of the same.

Our invention relates particularly to the class of tires disclosed in our application filed July 7, 1897, under Serial No. 643,720½, and allowed May 27, 1898, Patent No. 611,280.

The object of the invention is to improve the means for securing the tire to the rim of the wheel of a bicycle or other vehicle; and it may be said, briefly, to consist, first, in connecting the cover of the tire to the rim of the wheel by means of one or more open rings adapted to clasp the rim and having the ends of each of said rings connected by a yielding resistance, such as helical springs or the like; secondly, in connecting the tire itself to the rim independently of the cover at its side edges by a series of helical springs or the like, and, thirdly, in connecting each independent ring of a tire constructed of a series thereof to the rim of a wheel by a series of flexible guys secured at their outer ends to said independent rings by means of short lengths of wire or rod, to each of which the outer end of a guy is connected, while the wire or rod is connected rigidly to said independent rings at a number of different points, the other or inner ends of the flexible guys being connected to the rim. For full comprehension, however, of the invention reference must be had to the accompanying drawings, forming a part of this specification, in which like symbols indicate the same parts, and wherein—

Figure 1:
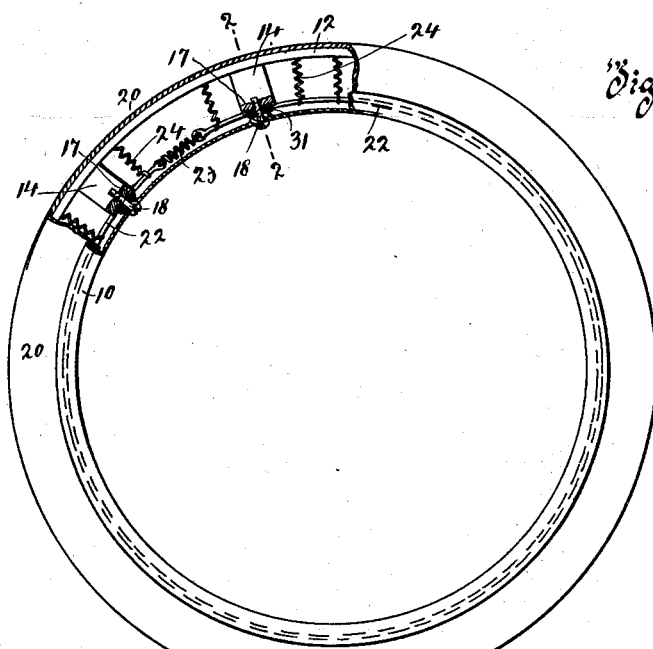
Figure 2:
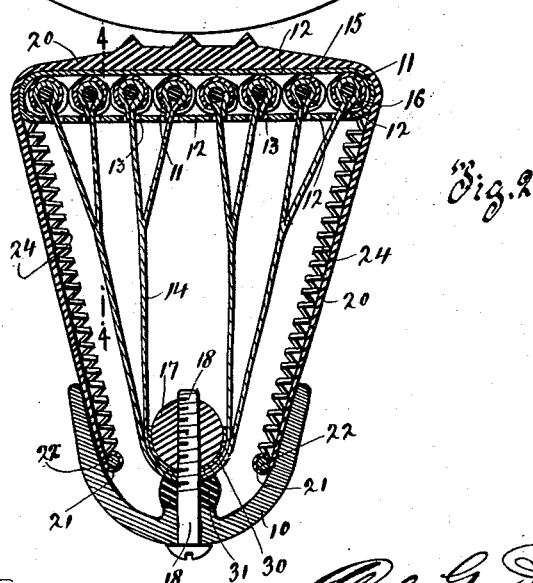

Figure 1 is a side elevation, partly in section, of the rim and tire of a wheel constructed according to our invention; Fig. 2, an enlarged transverse vertical sectional view thereof, taken on line 2 2, Fig. 1; Fig. 3, a similar view to Fig. 2, but illustrating an alternative manner of connecting the tire to the rim according to our invention; Fig. 4, an enlarged vertical sectional view taken on line 4 4, Fig. 2; Fig. 5, a transverse vertical sectional view taken on line 5 5, Fig. 4; and Fig. 6, an enlarged detailed perspective view of the clip.

The hub and spokes of the wheel and the manner of connecting them together and the latter to the rim do not constitute any part of our invention, and therefore will not be further alluded to.

The rim 10 is of U shape in cross-section and is preferably made of wood or other light material.

The tire is preferably made up of a series of U-shaped rings 11, arranged side by side and inclosed in a loop 12, slit as at 13. A series of flexible textile guy-strips 14 are connected about midway of their length to the rim 10 by tension devices, and their ends take through the slits 13 and are looped to take over and be connected to short lengths of wire or rods 15, adapted to fit into the U-shaped rings of the tire, and a clip 16 holds each end of the wire or rod 15 against displacement. This clip is shown in detail in Fig. 6.

The tension devices preferably consist of short rods 17 (over which the guy-strips are looped) and screws 18, taking freely through the rim and threaded into said rods 17, an opening being cut in each guy-strip to accommodate the screw.

The cover 20 is made of the material usually employed in the manufacture of bicycle-tire covers, and the edges thereof are preferably formed with loops 21 to receive a pair of open rings 22, the ends of each of which are connected together by a coiled spring 23 or the like, while the tire proper is connected to said flexible rings 22 also by a series of coiled springs 24, as shown clearly in Figs. 1 and 2. It is obvious that when great lightness is required rather than durability the cover can be cut away, the flexible rings 22 and guys 14 dispensed with, and the coiled springs connected at their ends to the shortened sides of the cover and to the edges of the rim, as shown in Fig. 3, without departing from the spirit of our invention. U-shaped washers 30 take upon the rods 17 on the inner side thereof, and soft pads 31, of any suitable material, such as cork or rubber, are provided to keep the rods and washers and screws 18 in place when the guy-strips become slackened.

What we claim is as follows:

1. In a wheel, the combination with the rim and tire thereof the tire being of greater width than the rim, of a series of coiled springs connecting the side edges of said tire to the adjacent side edges of the rim and said springs converging toward the center of the wheel in a plane at right angles to the axis thereof, substantially as shown.

2. In a wheel, the combination with the rim and tire thereof the tire being of greater width than the rim of a cover for the tread of the tire, and a series of coiled springs connecting the side edges of said cover to the adjacent edges of said rim, substantially as shown.

3. In a wheel, the combination with the rim and tire thereof, of a pair of rings circumferentially encircling said rim, a series of coiled springs connecting the side edges of said tire to said rings, and a cover taking over said tire and coiled springs and having its side edges connected to said rings, for the purpose set forth.

4. In a wheel the combination with the rim and tire, thereof, of a pair of open rings circumferentially encircling said rim, a coiled spring for connecting the ends of each of said rings, a series of coiled springs connecting the side edges of said tire to said rings; and a cover taking over said tire and coiled springs and having its side edges connected to said rings for the purpose set forth.

5. In a wheel, the combination with the rim and tire thereof the tire consisting of a series of rings of U shape in cross-section and arranged side by side, of a series of flexible guy-strips extending from said rim to said rings; a series of short lengths of wire taking into the cavities of said rings; a series of clips adapted to retain said short lengths of wire in place; said guy-strips being connected at their outer ends to said short lengths of wire; and means for connecting the inner ends of said guy-strips to the rim, substantially as and for the purpose set forth.

In testimony whereof we have affixed our signatures in presence of two witnesses.

CHARLES GEORGE ROBERTON.
JAMES JACKSON ROBERTON.

Witnesses:
WALTER NELSON,
WILLIAM DRINNAN.